US008854524B2

(12) United States Patent
Jang

(10) Patent No.: US 8,854,524 B2
(45) Date of Patent: Oct. 7, 2014

(54) METHOD AND APPARATUS FOR DISPLAYING FIRST CONTENT ALONE OR FIRST AND SECOND CONTENT SIMULTANEOUSLY BASED ON MOVEMENT

(71) Applicant: Samsung Electronics Co., Ltd., Suwon-si (KR)

(72) Inventor: In-ra Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 13/681,777

(22) Filed: Nov. 20, 2012

(65) Prior Publication Data
US 2013/0258127 A1 Oct. 3, 2013

(30) Foreign Application Priority Data
Apr. 2, 2012 (KR) ........................ 10-2012-0034091

(51) Int. Cl.
*H04N 5/222* (2006.01)
*H04N 5/232* (2006.01)
*H04N 5/445* (2011.01)

(52) U.S. Cl.
CPC ....... *H04N 5/23293* (2013.01); *H04N 5/23216* (2013.01); *H04N 5/23296* (2013.01); *H04N 5/23245* (2013.01); *H04N 5/445* (2013.01)
USPC ................................ 348/333.02; 348/333.05

(58) Field of Classification Search
CPC ........................ H04N 5/23293; H04N 5/23258
USPC ............ 348/135, 142, 143, 161, 169, 333.02, 348/333.05, 333.11
See application file for complete search history.

(56) References Cited

U.S. PATENT DOCUMENTS

| 6,937,272 B1 | 8/2005 | Dance |
| 8,179,449 B2* | 5/2012 | Larsson et al. ............. 348/222.1 |
| 2005/0195308 A1* | 9/2005 | Miyashita ................ 348/333.01 |

(Continued)

FOREIGN PATENT DOCUMENTS

| JP | 2000-161969 A | 6/2000 |
| JP | 2004-215062 A | 7/2004 |

(Continued)

OTHER PUBLICATIONS

PCT Search Report and Written Opinion established for PCT/KR2013/002570 (Jul. 29, 2013).
Search Report established for EP 13160708.7 (Jul. 10, 2013).

*Primary Examiner* — Kelly L Jerabek
(74) *Attorney, Agent, or Firm* — Drinker Biddle & Reath LLP

(57) ABSTRACT

A digital image processing apparatus, and a controlling method thereof are provided. The digital image processing apparatus displaying first content and second content generated with respect to the first content includes: a sensing unit that senses a movement of the digital image processing apparatus; a movement detecting unit that determines a movement of the digital image processing apparatus based on a sensed signal from the sensing unit; and a display control unit that controls display of the first and second contents, wherein the display control unit controls a single reproduction of the first content or a simultaneous reproduction of the first and second contents based on the determination of the movement detecting unit. A user may easily and intuitively manage various contents by using the digital image processing apparatus.

20 Claims, 10 Drawing Sheets

(56) References Cited

U.S. PATENT DOCUMENTS

| | | |
|---|---|---|
| 2007/0266312 A1 | 11/2007 | Ayaki et al. |
| 2009/0079765 A1 | 3/2009 | Hoover |
| 2009/0290047 A1 | 11/2009 | Sogoh et al. |
| 2010/0295958 A1* | 11/2010 | Larsson et al. ............. 348/222.1 |
| 2011/0076003 A1 | 3/2011 | Cho et al. |
| 2011/0164163 A1* | 7/2011 | Bilbrey et al. ........... 348/333.01 |
| 2011/0298942 A1 | 12/2011 | Uchida et al. |

FOREIGN PATENT DOCUMENTS

| | | |
|---|---|---|
| JP | 2008-033821 A | 2/2008 |
| KR | 10-2010-0121997 A | 11/2010 |
| KR | 10-2011-0032209 A | 3/2011 |
| WO | WO 2008/044606 A1 | 4/2008 |

* cited by examiner

METHOD AND APPARATUS FOR DISPLAYING FIRST CONTENT ALONE OR FIRST AND SECOND CONTENT SIMULTANEOUSLY BASED ON MOVEMENT

CROSS-REFERENCE TO RELATED PATENT APPLICATION

This application claims the benefit of Korean Patent Application No. 10-2012-0034091, filed on Apr. 2, 2012, in the Korean Intellectual Property Office, the disclosure of which is incorporated herein in its entirety by reference.

BACKGROUND

Disclosed herein is a digital image processing apparatus and a controlling method thereof.

Digital image processing apparatuses, such as digital cameras and camcorders, have become portable due, in part, to the miniaturization and development of batteries, etc., and thus images are easily captured anywhere. In addition, digital image processing apparatuses provide various functions for a user to capture a high quality image, even if the user is not an expert.

Also, digital image processing apparatuses provide various functions for a user to easily control its contents such as moving images and still images.

SUMMARY

One or more embodiments of the invention provide a digital image processing apparatus for a user to easily and intuitively manage various contents and the digital image processing apparatus.

According to an embodiment of the invention, there is provided a digital image processing apparatus that displays first content and second content generated with respect to the first content, the digital image processing apparatus including: a sensing unit that senses a movement of the digital image processing apparatus; a movement detecting unit that determines a movement of the digital image processing apparatus based on a sensed signal from the sensing unit; and a display control unit that controls display of the first and second contents, wherein the display control unit controls a single reproduction of the first content or a simultaneous reproduction of the first and second contents based on the determination of the movement detecting unit.

The movement detecting unit may determine a change of a distance between the digital image processing apparatus and a user.

If the distance between the digital image processing apparatus and the user decreases when the first content is reproduced alone, the display control unit may perform the simultaneous reproduction of the first and second contents.

If the distance between the digital image processing apparatus and the user increases while the first and second contents are being simultaneously reproduced, the display control units may perform the single reproduction of the first content.

The digital image processing apparatus may further include a manipulation unit that generates a manipulation signal according to a manipulation by a user.

While the first and second contents are being simultaneously reproduced, a single reproduction of the second content may be performed based on the manipulation signal.

The first content may be a moving image, and the second content may be a still image captured while the moving image is being captured.

The display control unit may display a plurality of second contents while the first and second contents are being simultaneously reproduced.

The display control unit may reproduce the first content from a point of time when the second content selected by a user is captured.

The first content may be a moving image, and the second content may be a map indicating a location where the moving image is captured while the moving image is being captured.

The display control unit may perform a single reproduction of the second content based on a manipulation signal from the user.

According to another embodiment of the invention, there is provided a method of controlling a digital image processing apparatus that displays first content and second content generated with respect to the first content, the method including: sensing a movement of the digital image processing apparatus; determining the movement of the digital image processing apparatus based on a result of the sensing; and selecting a reproduction mode between a single reproduction of the first content or a simultaneous reproduction of the first and second contents based on the result of the sensing.

The determining of the movement may be performed by sensing a change of a distance between the digital image processing apparatus and a user.

The selecting of the reproduction mode may include converting the reproduction mode to the simultaneous reproduction of the first and second contents if the distance between the digital image processing apparatus and the user decreases while the first content is being reproduced alone.

The selecting of the reproduction mode may include converting the reproduction mode to the single reproduction of the first content if the distance between the digital image processing apparatus and the user increases while the first and second contents are being simultaneously reproduced.

The first content may be a moving image, and the second content may be a still image captured while the moving image is being captured, and the method may further include reproducing the first content from a point of time when the second content selected by a user is captured while the first and second contents are being simultaneously reproduced.

A plurality of second contents may be displayed while the first and second contents are being simultaneously reproduced.

The first content may be a moving image, and the second content may be a map indicating a location where the moving image is captured while the moving image is captured, and the method may further include converting the reproduction mode to a single reproduction of the second content based on the manipulation signal from a user when the first and second contents are being simultaneously reproduced.

According to the embodiments of the invention, the digital image processing apparatus may allow a user to easily and intuitively manage various contents and the digital image processing apparatus.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
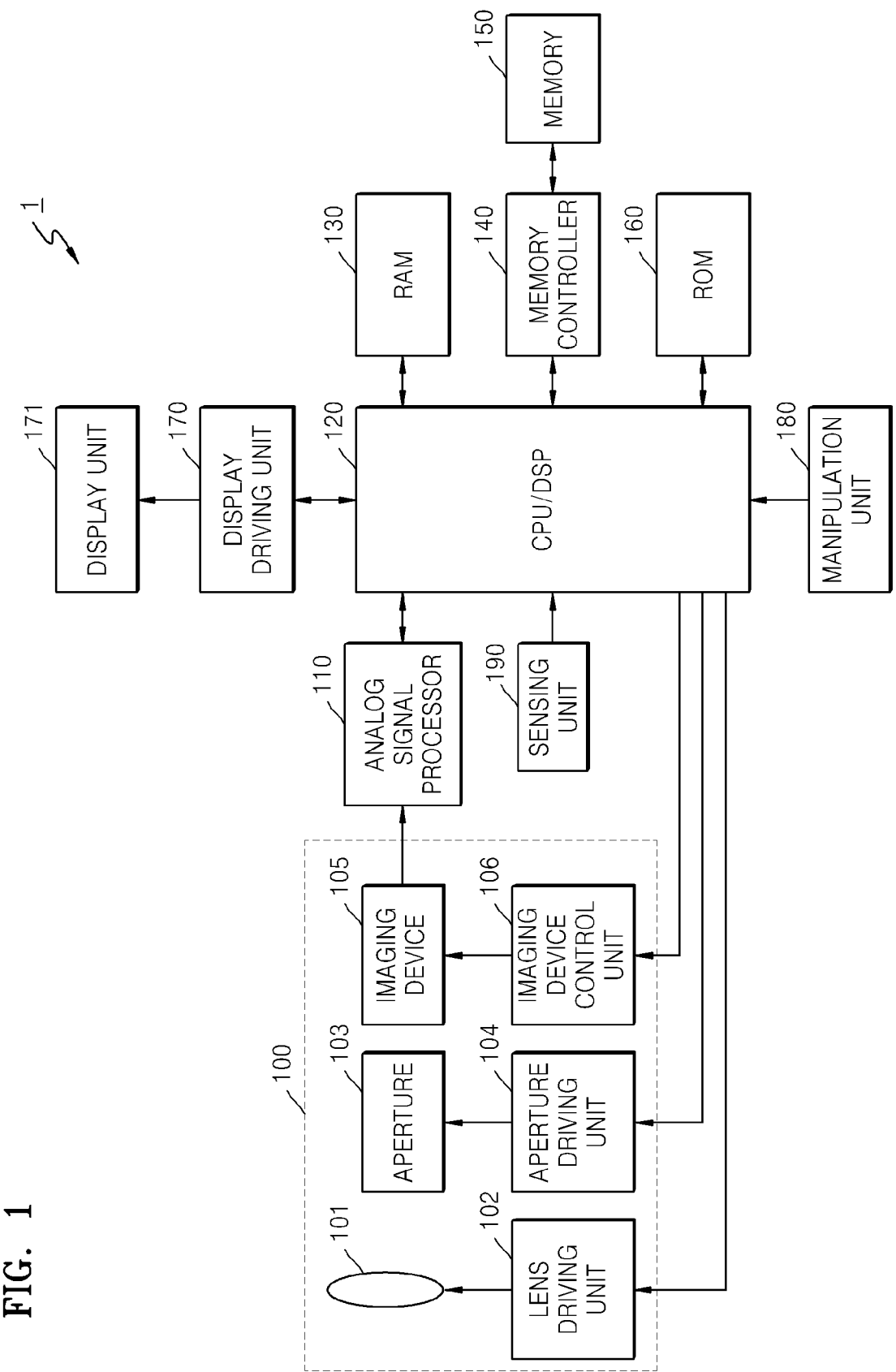
FIG. 1 is a block diagram illustrating a digital image processing apparatus according to an embodiment of the invention.

Hereinafter, the invention will be described more fully with reference to the accompanying drawings, in which exemplary embodiments of the invention are shown. Expressions such as at least one of," when preceding a list of elements, modify the entire list of elements and do not modify the individual elements of the list.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Like reference numerals in the drawings denote like elements, and thus their description will not be repeated.

FIG. 1 is a block diagram illustrating a digital image processing apparatus 1 according to an embodiment of the invention. A digital camera is illustrated herein as the digital image processing apparatus 1, but the digital image processing apparatus 1 is not limited thereto.

Referring to FIG. 1, the digital image processing apparatus 1 includes a photographing unit 100, an analog signal processor 110, a central processing unit (CPU)/digital signal processor (DSP) 120, a random access memory (RAM) 130, a memory controller 140, a memory 150, a read-only memory (ROM) 160, a display driving unit 170, a display unit 171, a manipulation unit 180, and a sensing unit 190.

An overall operation of the digital image processing apparatus 1 is controlled by the CPU/DSP 120. The CPU/DSP 120 provides a control signal for operating each element to a lens driving unit 102, an aperture driving unit 104, and an imaging device control unit 106, or the like. In the current embodiment, a CPU performing a control function and a DSP performing signal processing are configured as one device, but they are not limited thereto. For example, the CPU and the DSP may be configured as individual devices.

The photographing unit 100 is an element for generating an electric signal from incident light to form an image. The photographing unit 100 may include a lens 101, a lens driving unit 102, an aperture 103, an aperture driving unit 104, an imaging device 105, and an imaging device control unit 106.

The lens 101 may include a plurality of groups of lenses or a plurality of lenses. A location of the lens 101 may be controlled by the lens driving unit 102. The lens driving unit 102 controls the location of the lens 101 according to a control signal provided from the CPU/DSP 120.

An opening/closing degree of the aperture 103 is controlled by the aperture driving unit 104, and the aperture 104 adjusts an amount of light incident on the imaging device 105. The aperture driving unit 104 operates the aperture 103 according to a control signal provided from the CPU/DSP 120.

The imaging device 105 captures image light of a subject that passes through the lens 101 and the aperture 103 to generate an image signal. The imaging device 105 may include a plurality of photoelectric conversion units aligned in a matrix form and a charge transfer pathway through which charges are transferred from the photoelectric conversion units. The imaging device 105 may be a charge coupled device (CCD) image sensor or a complementary metal oxide semiconductor image sensor (CIS).

Sensitivity of the imaging device 105 may be adjusted by the imaging device control unit 106. The imaging device control unit 106 may control the imaging device 105 according to a control signal that is automatically generated by an image signal that is input in real time or a control signal that is manually input by an operation of a user.

An exposure time of the imaging device 105 is adjusted by a shutter (not shown). The shutter (not shown) includes a mechanical shutter for adjusting incidence of light by moving a curtain and an electronic shutter for controlling exposure by applying an electric signal to the imaging device 105.

The imaging device control unit 106 generates a timing signal and applies the timing signal to the imaging device 105, thereby controlling an imaging operation of the imaging device 105. Also, the image pickup device controller 106 controls the imaging device 105 to sequentially read image signals when accumulation of charges in each scan line of the imaging device 105 is completed.

The analog signal processor 110 performs noise reduction processing, gain control, waveform shaping, and analog-digital conversion processing on an analog image signal applied by the imaging device 105. A signal processed by the analog signal processor 110 may be input to the CPU/DSP 120 directly or via the RAM 130.

The RAM 130 functions as a main memory of the digital image processing apparatus 1 and temporarily stores information required while operating the CPU/DSP 120. The ROM 160 stores a program such as an operating system or application system that operates the digital image processing apparatus 1.

The memory controller 140 controls input and output of data to the memory 150. The memory 150 may store a file, such as a still image file or a moving image file. The memory 150 may separately store a moving image constituting first content and second content generated with respect to the moving image. The second content may be a still image captured during the moving image capturing, i.e., a dual capture image. Alternatively, the second content may be a map that indicates a location where the moving image is captured. The memory 150 may separately store metadata about related information between the first and second content.

The display driving unit 170 controls an image output to the display unit 171.

The display unit 171 may display a live view image captured in real-time, a quick view image temporarily displayed after an image is captured, a reproduction image that is stored, and the like. Also, the display unit 171 may display various pieces of setup information.

The display unit 171 and the display driving unit 170 may include, for example, a liquid crystal display (LCD) and an LCD driver. Alternatively, the display unit 171 and the display driving unit 170 may include, for example, an organic light emitting display (OLED) and an OLED driver. In addition, the display unit 171 may include a touch screen that recognizes a touch input as an element of the manipulation unit 180.

The manipulation unit 180 is an element that receives an instruction from a user and generates a manipulation signal to manipulate the digital image processing apparatus 1. The manipulation unit 180 may include various input keys such as a power button, a shutter-release button, a zoom button, a mode dial button, a menu button, a 4-direction button, and a jog dial button. The manipulation unit 180 may also include a touch screen that senses contact of a part of a user's body and generate an instruction according to the touch.

The sensing unit 190 senses a movement of the digital image processing apparatus 1. The sensing unit 190 generates a sensed signal of the movement of the digital image processing apparatus 1 when the digital image processing apparatus 1 is moved by the user and sends the sensed signal to the CPU/DSP 120. The sensing unit 190 may include at least one of an acceleration sensor, a gyro sensor, and a geomagnetism sensor to sense the movement of the digital image processing apparatus 1. Particularly, the sensing unit 190 may include any known sensor that can sense a change of a distance between the user and the digital image processing apparatus 1.

The CPU/DSP 120 processes an input image signal and controls each element according to the input image signal or an external input signal. The CPU/DSP 120 will be described in more detail with reference to FIGS. 2 and 3.

Figure 2:
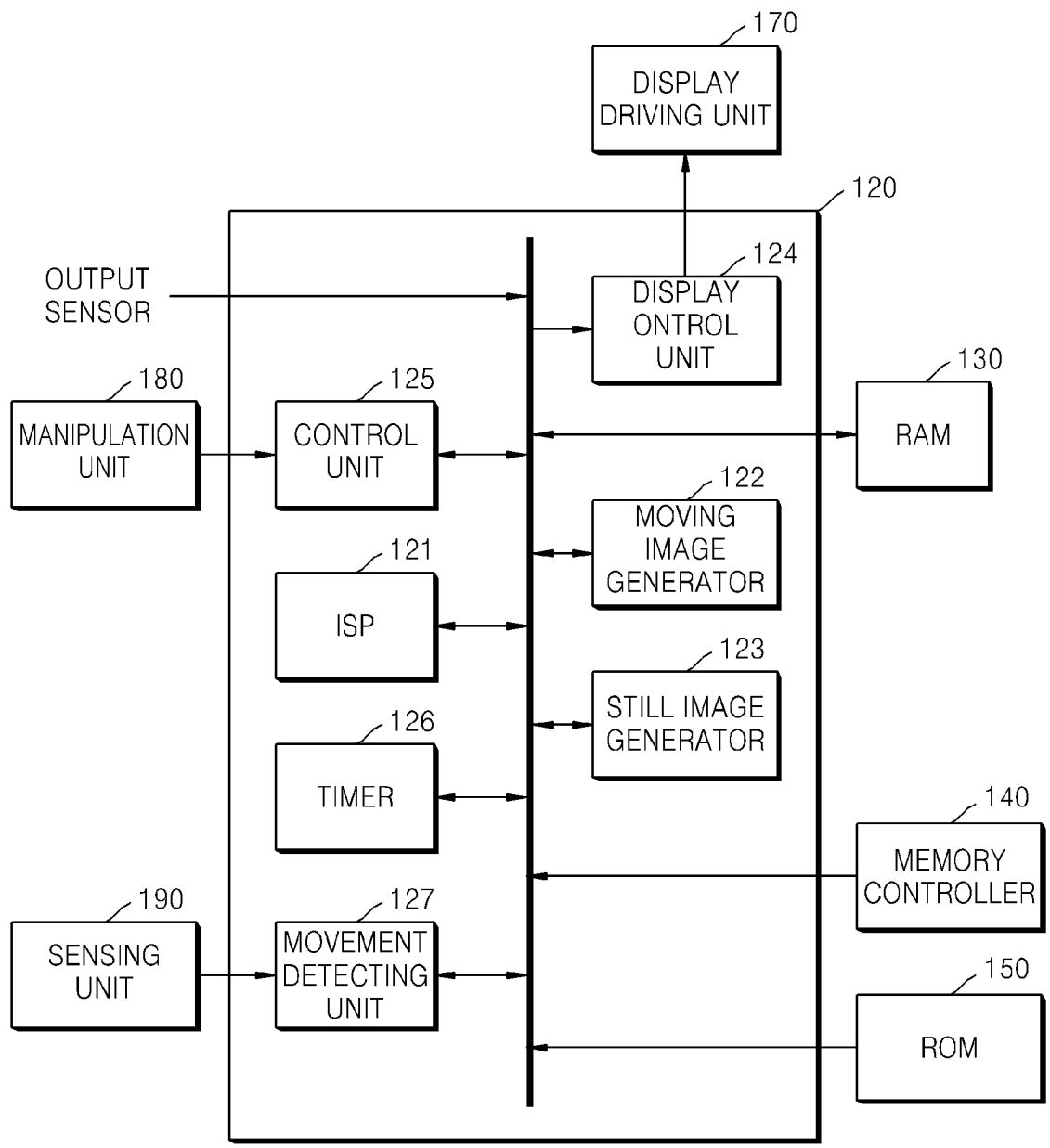
FIG. 2 is a block diagram illustrating a central processing unit (CPU)/digital signal processor (DSP) according to an embodiment of the invention.

FIG. 2 is a block diagram illustrating the CPU/DSP 120 according to an embodiment of the invention.

Referring to FIG. 2, the CPU/DSP 120 may include an image signal processor (ISP) 121, a moving image generator 122, a still image generator 123, a display control unit 124, a control unit 125, a timer 126, and a movement detecting unit 127.

The ISP 121 may perform image signal processing for improving the quality of an image, such as, noise reduction in input image data, gamma correction, color filter array interpolation, color matrix processing, color correction, and color enhancement.

The ISP 121 may also perform indistinctness processing, a color processing, blur processing, edge emphasis processing, image interpretation processing, image recognition processing, image effect processing, etc. The image recognition processing may include face recognition processing, scene recognition processing, or the like. The ISP 121 may also perform a display image signal processing for displaying an image on the display unit 171. For example, the ISP 121 may perform brightness level adjustment, color correction, contrast adjustment, contour emphasis adjustment, screen division processing, character image generation, image synthesis processing, or the like.

The digital image processing apparatus 1 may be connected to an external monitor, and the ISP 121 may process an image signal to display an image on the external monitor. The image data processed as described above may be transferred to the external monitor and displayed on the external monitor.

The moving image generator 122 may generate a moving image file by compressing the image data that is generated by processing the image signal for improving the quality of the image. In addition, the moving image generator 122 may restore the moving image data from the moving image file. The image data is compressed in a lossy or non-lossy format.

The still image generator 123 may generate a still image file by compressing the image data that is generated by processing the image signal for improving the quality of the image. In addition, the still image generator 123 may restore the still image data from the still image file. The image data is compressed in a lossy or non-lossy format.

As an example of an appropriate format for compressing the image data as a still image, the image data may be converted into a joint photographing experts group (JPEG) format or JPEG 2000. If a moving image is recorded, a plurality of frames may be compressed according to Moving Picture Experts Group (MPEG) standards to generate a moving image file. The image file may be generated according to, for example, Exchangeable image file format (Exif) standards.

In the current embodiment, the moving image generator 122 and the still image generator 123 are configured as individual units, but they are not limited thereto. For example, the moving image generator 122 and the still image generator 123 may be configured as one unit, and may perform a suitable operation according to a type of input image.

The display control unit 124 controls a display driving unit 170 to control an image display of the display unit 171. For example, the display control unit 124 may display a moving image that is being captured in real-time or a moving image stored in the memory 150 on the display unit 171. In addition, the display control unit 124 may control a reproduction of a live view image or a still image.

The display control unit 124 may control a method of reproducing a moving image and a still image or a moving image and a map based on the determination of the movement detecting unit 127. A method of reproducing a plurality of contents according to the movement of the digital image processing apparatus 1 will be described in detail later.

The control unit 125 controls each element of the CPU/DSP 120. The control unit 125 may execute programs stored in the ROM 160 or include a separate module to generate a control signal for controlling an auto-focusing, zooming, focusing, or auto-exposure compensation. The control unit 125 provides the control signal to the lens driving unit 102, the aperture driving unit 104, and the imaging device control unit 106, and controls overall operations of elements of the digital image processing apparatus 1 such as a shutter and strobe.

The control unit 125 may also control each element to perform operations corresponding to the signal applied by the manipulation unit 180.

The timer 126 provides time information. The time information provided by the timer 126 may be inserted into a header region, or the like, of a file generated by the moving image generator 122 and the still image generator 123. In addition, the time information may be used as a pointer that indicates a point of time when the dual capture image is captured during the period of time the moving image is displayed.

The image data output from the ISP 121 is directly input to the memory controller 140 via the RAM 130, and the memory controller 140 stores the image data in the memory 150 automatically or according to a signal from the user. In addition, the memory controller 140 may read data of an image from the image file stored in the memory 150, and may provide the data to the display driving unit 170 through the RAM 130 and the display control unit 124 or through another path to display the image on the display unit 171. The memory 150 may be a detachable component or a built-in component of the digital image processing apparatus 1.

The movement detecting unit 127 determines a pattern of a movement of the digital image processing apparatus 1 based on the sensed signal received from the sensing unit 190. For example, the movement detecting unit 127 detects the pattern of the movement of the digital image processing apparatus 1 in terms of whether the digital image processing apparatus 1 moves toward the user or moves away from the user, or whether the digital image processing apparatus 1 rotates or is turned over.

Particularly, in the current embodiment, the movement detecting unit 127 detects a change of a distance between the digital image processing apparatus 1 and the user. For example, if the digital image processing apparatus 1 moves toward the display unit 171 in a reproducing mode, the movement detecting unit 127 determines that the digital image processing apparatus 1 moves toward the user. On the other hand, if the digital image processing apparatus 1 moves away from the display unit 171 in the reproducing mode, the movement detecting unit 127 determines that the digital image processing apparatus 1 moves away from the user. However, this method is illustrative, and the movement detecting unit 127 may detect the pattern of the movement of the digital image processing apparatus 1 based on a variety of algorithms.

When the movement detecting unit 127 determines the pattern of the movement of the digital image processing apparatus 1, the result is transmitted to the display control unit 124 directly or via the CPU/DSP 120. The display control unit 124 determines a method of reproducing contents on the display unit 171 based on the received result of the movement determination. The method of reproducing contents on the display unit 171 will be described later.

Figure 3:
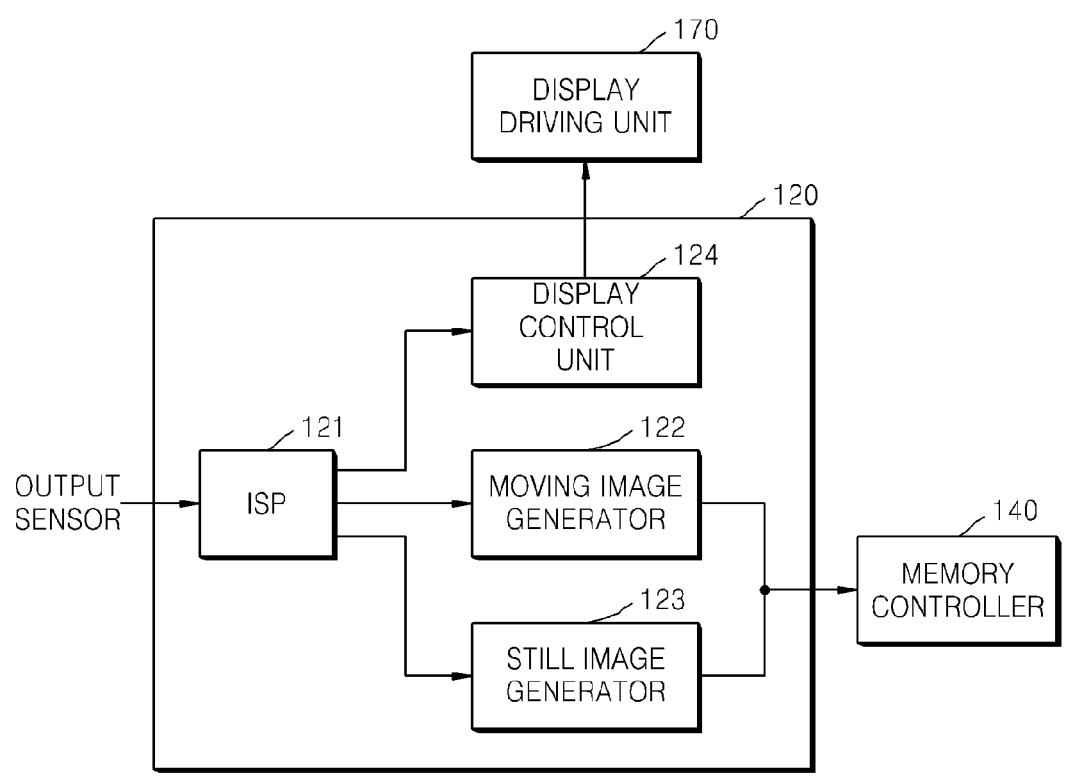
FIG. 3 is a block diagram illustrating image processing by the CPU/DSP of FIG. 2.

FIG. 3 is a block diagram of image processing by the CPU/DSP 120 of FIG. 2. FIG. 3 illustrates only a structure necessary for explaining the image processing.

Before describing FIG. 3, contents generated by the digital image processing apparatus 1 according to embodiments of the invention will be described.

The digital image processing apparatus 1 captures a moving image in a moving image shooting mode, which is from among the modes of the digital image processing apparatus 1, to generate a moving image file. While a moving image is being captured, when the user provides a capture signal to capture a still image at a predetermined point of time, a still image is generated separately from the moving image. A dual capture image as second content with respect to the main moving image constituting the first content is generated.

Alternatively, the digital image processing apparatus 1 may generate a map that indicates a location where the moving image is captured. On the map, the location where the moving image is captured may be displayed in real-time. In order to generate the map, the digital image processing apparatus 1 may store data of the map in the ROM 160, or the like, and may include a location recognizing unit (not shown) that recognizes the location, such as a GPS module.

The digital image processing apparatus 1 may reproduce a stored moving image. While reproducing the moving image, a dual capture image constituting the second content may also be generated as described above.

Hereinafter, generation of the main moving image, the dual capture image, or the map will be described in more detail.

Referring to FIG. 3, a sensor output is input to the ISP 121 of the CPU/DSP 120. In this regard, the sensor output is an image signal that is output from the imaging device 105 and processed and converted to a digital signal by the analog signal processor 110.

The ISP 121 processes the image signal in various ways as described above. Then, the ISP 121 scales down the input sensor output and outputs the sensor output having a standard size. The image signal output from the imaging device 105 has a size greater than that of the moving image stored as a file. Thus, the ISP 121 scales down the input sensor output to a standard size. The standard size is, for example, a size such as Full HD, HD, and SD.

The dual capture image may be generated by the controlling of the user, for example, by pressing a shutter-release button, and the dual capture image is a still image. The size of the dual capture image may be the same as that of the sensor output according to setups. Thus, the ISP 121 may temporarily store the sensor output that is not scaled down and use the stored sensor output when the generation of the dual capture image is required. The ISP 121 may include a buffer memory to store the sensor output. Or, the sensor output may be temporarily stored in the RAM 130.

In addition, if the digital image processing apparatus 1 includes a location recognition unit, a map indicating the location where the moving image is captured may be generated by the user. Change of locations may be displayed on the map in real-time.

An ISP output that is an image signal that was processed by the ISP 121 and output is transferred to the moving image generator 122. The moving image generator 122 that is a codec generates a moving image stream using the received ISP output and generates a moving image file using the moving image stream. In this regard, the moving image file is a main moving image constituting the first content.

In addition, if the shutter-release button is pressed, i.e., if an instruction of capturing a dual capture image is provided, the ISP 121 transfers a full-size sensor output stored in the buffer memory, or the like, to the still image generator 123. The full-size sensor output transferred to the still image generator 123 is also an image signal processed by the ISP 121.

The still image generator 123 that is a codec generates a still image by using the received ISP output. In this regard, the generated still image file is a dual capture image constituting the second content.

The ISP 121 may transfer the ISP output to the display control unit 124 to display an image being captured on the display unit 171. The display control unit 124 transfers the received ISP output to the display driving unit 170, and the display driving unit 170 displays the ISP output on the display unit 171.

Hereinafter, a method of managing contents according to an embodiment of the invention will be described. That is, a method of reproducing contents on the display unit 171 will be described.

Figure 4A:
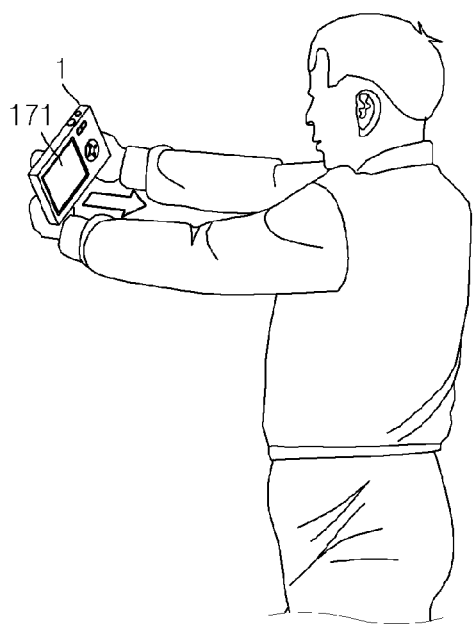
FIGS. 4A, B are pictorial images showing a digital image processing apparatus being moved by a user.
Figure 4B:
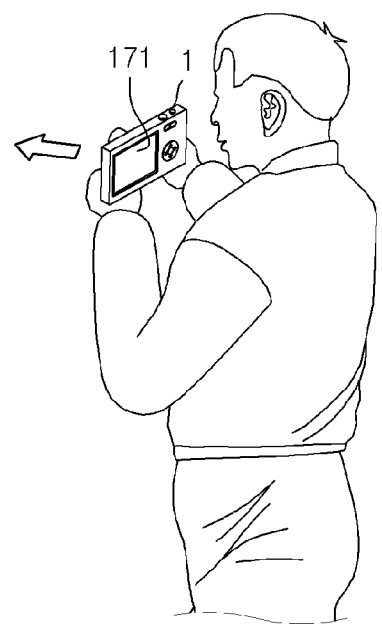

FIGS. 4A and 4B show a digital image processing apparatus 1 being moved by a user.

The user may reproduce stored contents such as a moving image or a still image in a reproducing mode by using the digital image processing apparatus 1. In this regard, as shown in FIGS. 4A and 4B, the user may move the digital image processing apparatus 1 forward and backward. FIG. 4A shows a user's motion of pulling the digital image processing apparatus 1 toward the user. FIG. 4B shows a user's motion of pushing the digital image processing apparatus 1 away from the user.

As such, the user may have various intentions when he or she moves the digital image processing apparatus 1. Particularly, the motion of pulling the digital image processing apparatus 1 toward the user may be performed when the user intends to change contents currently reproduced by additionally manipulating the digital image processing apparatus 1. In addition, the motion of pushing the digital image processing apparatus 1 away from the user may be performed when the user intends to stop the manipulation of the digital image processing apparatus 1 and watch the contents currently being reproduced.

According to embodiments of the invention, management of contents and manipulation of the digital image processing apparatus 1 may be facilitated by determining the user's intention.

Figure 5:
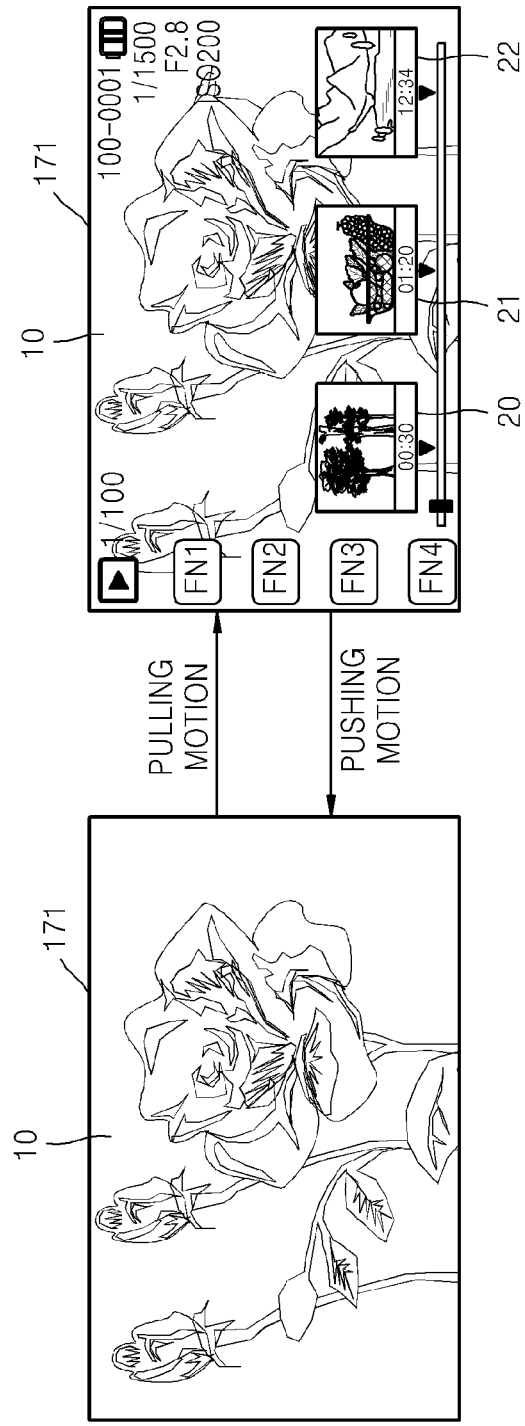
FIG. 5 contains screen shot diagrams for describing a method of managing contents according to an embodiment of the invention.

FIG. 5 shows diagrams for describing a method of managing contents according to an embodiment of the invention.

Referring to a diagram on the left of FIG. 5, a moving image 10 constituting the first content is displayed alone on the display unit 171. If the user pulls the digital image processing apparatus 1 toward the user as shown in FIG. 4A, the sensing unit 190 senses the movement, and the movement detecting unit 127 determines that the digital image processing apparatus 1 moves toward the user based on the sensed signal.

The display control unit 124 displays dual capture images 20 to 22 as second contents generated with respect to the moving image 10 currently reproduced on the display unit 171 based on the determination of the movement detecting unit 127. In this regard, the display control unit 124 may display a time line to recognize the degree of reproduction of the moving image 10, and each of the dual capture images 20 to 22 may be displayed at a point of time when each of the dual capture images 20 to 22 is captured in the time line as thumbnail data. The display control unit 124 may also display icons for various manipulations with the dual capture images 20 to 22.

On the other hand, the display unit 171 simultaneously displays the dual capture images 20 to 22 and the moving image 10 as shown in a diagram on the right of FIG. 5. When the user pushes the digital image processing apparatus 1 away from the user as shown in FIG. 4B, the sensing unit 190 senses the movement, and the movement detecting unit 127 determines that the digital image processing apparatus 1 moves away from the user based on the sensed signal.

The display control unit 124 ends the reproduction of the dual capture images 20 to 22 and the icons currently displayed on the display unit 171 based on the determination of the movement detecting unit 127, and closes the dual capture images 20 to 22 and the icons on the display unit 171. Then, the display control unit 124 reproduces the moving image 10 alone.

Figure 6:
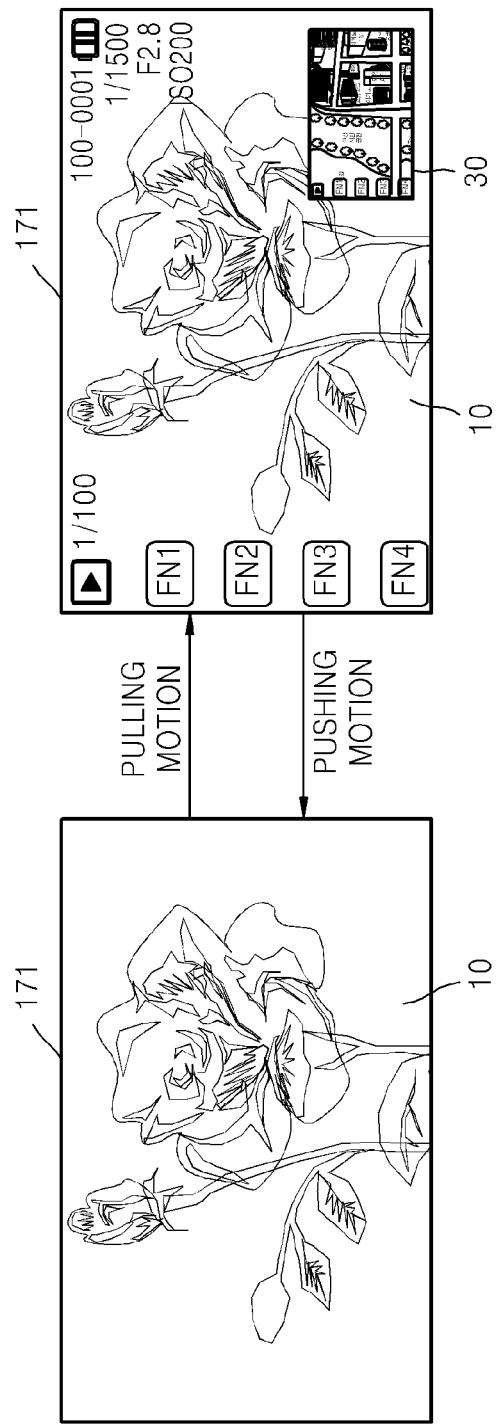
FIG. 6 contains screen shot diagrams for describing a method of managing contents according to another embodiment of the invention.

FIG. 6 shows diagrams for describing a method of managing contents according to an embodiment of the invention.

Referring to FIG. 6, a moving image 10 constituting the first content is displayed alone on the display unit 171 in a diagram on the left of FIG. 6. If the user pulls the digital image processing apparatus 1 toward the user as shown in FIG. 4A, the sensing unit 190 senses the movement, and the movement detecting unit 127 determines that the digital image processing apparatus 1 moves toward the user based on the sensed signal.

The display control unit 124 displays a map 30 constituting the second content generated with respect to the moving image 10 currently reproduced on a portion of the display unit 171 based on the determination of the movement detecting unit 127. The display control unit 124 may also display icons for various manipulations with the map 30.

On the other hand, the display unit 171 simultaneously displays the map 30 and the moving image 10. When the user pushes the digital image processing apparatus 1 away from the user as shown in FIG. 4B, the sensing unit 190 senses the movement, and the movement detecting unit 127 determines that the digital image processing apparatus 1 moves away from the user based on the sensed signal.

The display control unit 124 ends the display of the map 30 and the icons currently displayed on the display unit 171 based on the determination of the movement detecting unit 127 and closes the map 30 and the icons on the display unit 171. Then, the display control unit 124 reproduces the moving image 10 alone.

Figure 7:
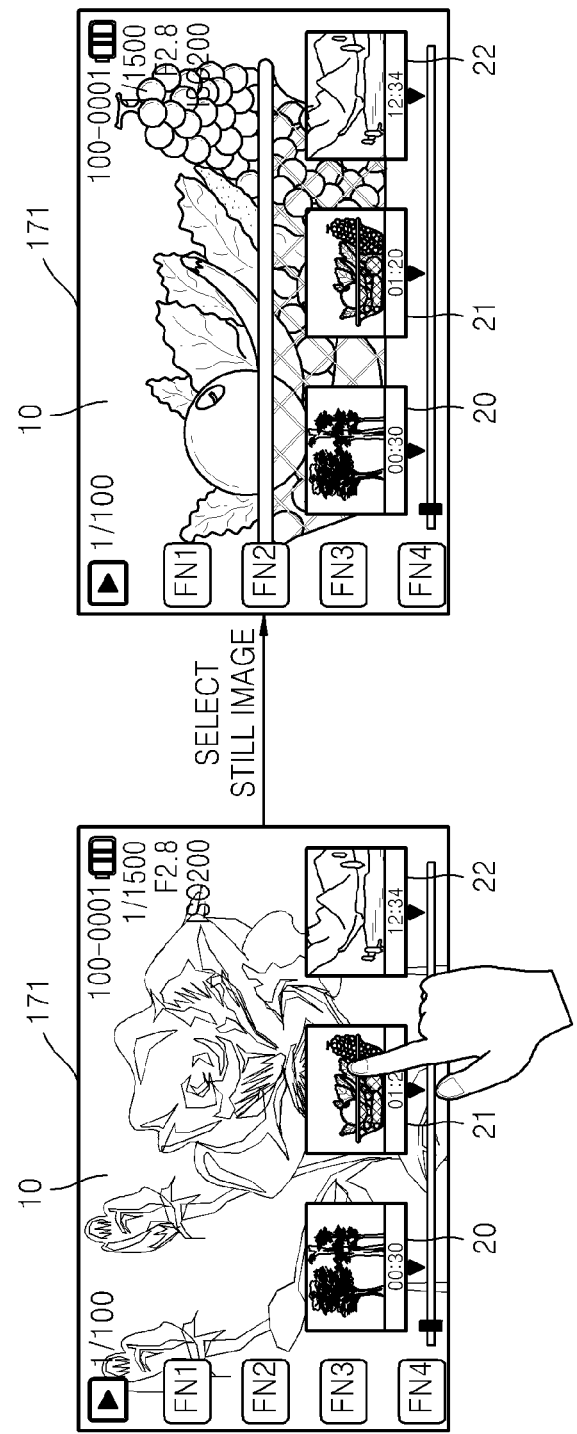
FIG. 7 contains screen shot diagrams for describing a method of managing contents according to another embodiment of the invention.

FIG. 7 shows diagrams for describing a method of managing contents according to an embodiment of the invention.

Referring to FIG. 7, a moving image 10 and dual capture images 20 to 22 are simultaneously displayed on the display unit 171 in a diagram on the left of FIG. 7. The user selects one of the dual capture image 21 by touching the display unit 171.

When a specific dual capture image 21 is selected by the user, a manipulation signal by the user is applied to the CPU/DSP 120, and the CPU/DSP 120 provides a control signal to the display control unit 124 based on the manipulation signal. According to the control signal, the display control unit 124 reproduces the moving image 10 from a point of time when the selected dual capture image 21 is captured in a diagram on the right of FIG. 7. That is, the point of time of reproduction of the moving image 10 is changed by the user's manipulation.

When the moving image 10 is reproduced from the point of time when the selected dual capture image 21 is captured, the display of the other dual capture images 20 and 22 and the icons which are currently displayed may be ended.

Figure 8:
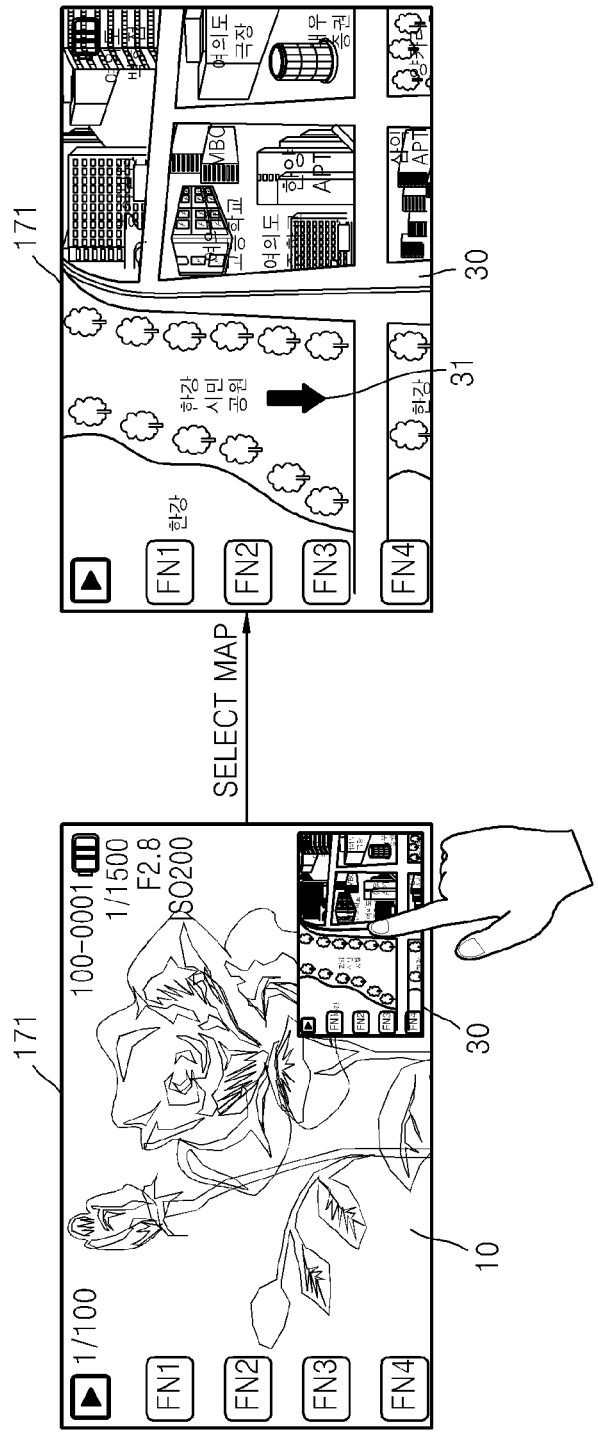
FIG. 8 contains screen shot diagrams for describing a method of managing contents according to another embodiment of the invention.

FIG. 8 shows diagrams for describing a method of managing contents according to an embodiment of the invention.

Referring to FIG. 8, a moving image 10 and a map 30 are simultaneously displayed on the display unit 171 in a diagram on the left of FIG. 8. Then, the user selects the map 30.

When the map 30 is selected by the user, a manipulation signal according to the manipulation by the user is applied to the CPU/DSP 120, and the CPU/DSP 120 applies a control signal to the display control unit 124 based on the manipulation signal. According to the control signal, the display control unit 124 magnifies and reproduces the map 30 as shown in a diagram on the right of FIG. 8. That is, the map 30 is displayed alone.

When the map 30 is selected and displayed alone, the display of the icons for manipulation currently displayed may be ended. Furthermore, a location where an image is captured may be displayed on the map 30 using a mark 31 such as an arrow as shown in FIG. 8. In addition, while the moving image is captured while moving, the mark 31 displaying the location may also be moved. In addition, if the location widely moves, an area or a scale of the map may also be changed. Thus, the map 30 and the mark 31 which are displayed on the display unit 171 may be updated with time. The changes of the map 30 and mark 31 may be synchronized with the moving image in accordance with the reproduction time, although the map 30 and mark 31 are not displayed on the display unit 171.

In FIGS. 7 and 8, a touch panel installed in the display unit 171 is used as the manipulation unit 180, but the manipulation unit 180 is not limited thereto. That is, the user may select the dual capture images 20 to 22 or the map 30 by using various buttons of the digital image processing apparatus 1.

In addition, examples of the second content are the dual capture images 20 to 22 or the map 30 with regard to the moving image, but the invention is not limited thereto. If content is used as first content, various contents generated with respect to the first content may be regarded as second contents in the method described above.

Figure 9:
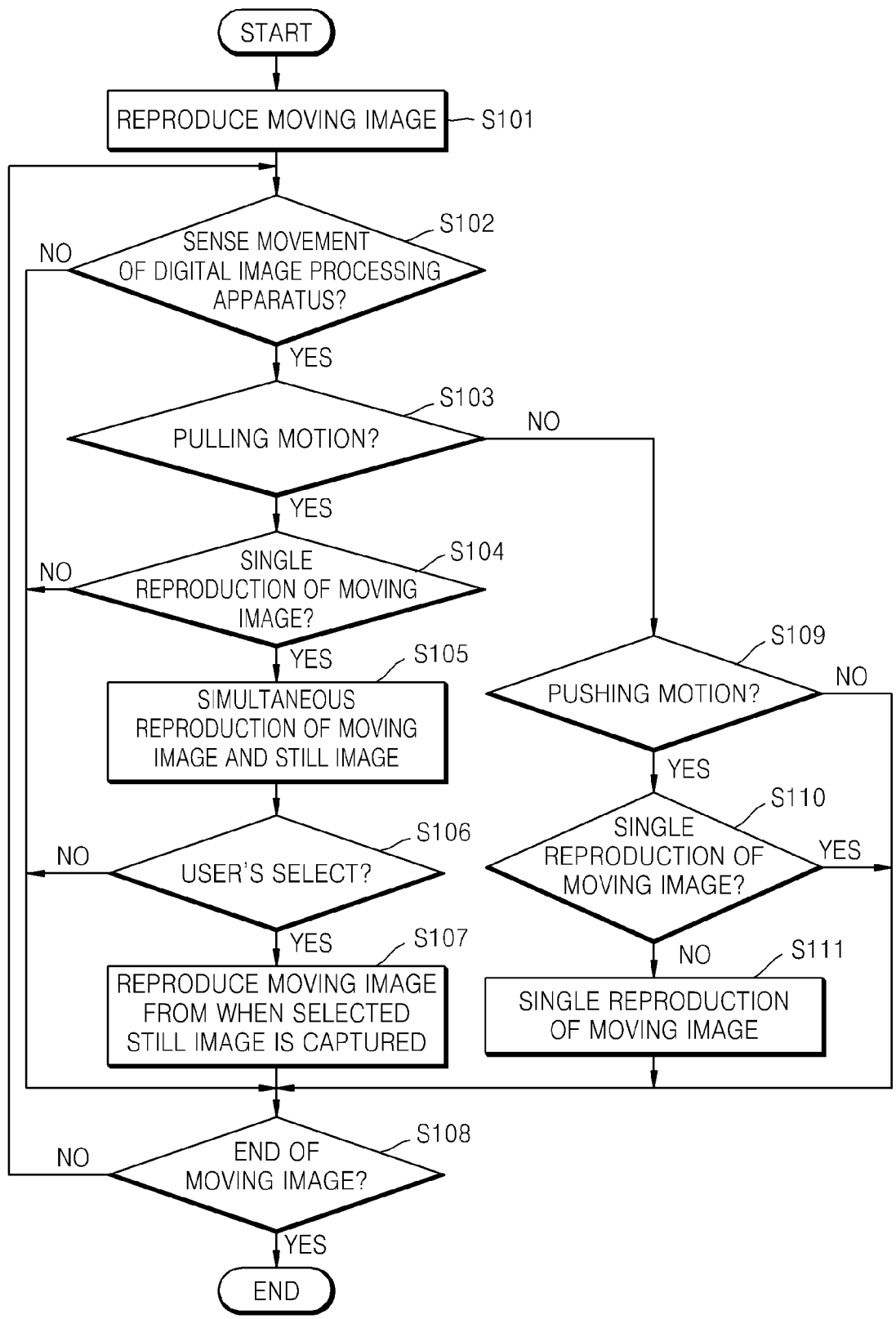
FIG. 9 is a flowchart illustrating a control method performed by a digital image processing apparatus according to an embodiment of the invention.

FIG. 9 is a flowchart illustrating a control method performed by the digital image processing apparatus 1 according to an embodiment of the invention.

In a reproducing mode, the moving image is reproduced according to selection by the user (Operation S101). The sensing unit 190 senses movements of the digital image processing apparatus 1 (Operation S102).

When the sensing unit 190 senses a movement of the digital image processing apparatus 1, the movement detecting unit 127 determines whether the movement is toward the user (Operation S103). That is, the movement detecting unit 127 detects a change of a distance between the digital image processing apparatus 1 and the user. If the movement detecting unit 127 determines that the movement is a motion of pulling the digital image processing apparatus 1, i.e., that the distance between the digital image processing apparatus 1 and the user decreases, the CPU/DSP 120 or display control unit 124 determines whether the display unit 171 is displaying the moving image alone (Operation S104).

If the display unit 171 is displaying only the moving image, the display control unit 124 simultaneously reproduces the moving image and a still image that is a dual capture image and generated with respect to the moving image on the display unit 171 (Operation S105). That is, the mode of reproducing contents is converted. The reproduction was described above with reference to FIG. 5, and the description thereof will not repeated here.

The CPU/DSP 120 determines whether a specific still image is selected by the user while the moving image and the dual capture image are being simultaneously reproduced (Operation S106). If the user selects a specific still image, the display control unit 124 reproduces the moving image from the point of time when the selected still image is captured based on a control signal from the CPU/DSP 120.

The CPU/DSP 120 determines whether the moving image is ended (Operation S108). If the moving image is not ended, the CPU/DSP 120 returns to the operation S102, and then repeats the operations described above while reproducing the moving image. On the other hand, if the moving image is ended, the process is stopped.

If the movement of the digital image processing apparatus 1 is not sensed in the operation S102, if the moving image is not reproduced alone in the operation S104, or if there is no user's selection in the operation 106, the operation S108 is performed, so that the reproduction of the moving image is repeated or the process is terminated depending on the end of the reproduction of the moving image.

In addition, in operation S103, if the sensing unit 190 senses a motion of digital image processing apparatus 1 which is not a pulling motion, the movement detecting unit 127 determines whether the movement of the digital image processing apparatus 1 is away from the user (Operation S109). If the movement detecting unit 127 determines that the movement is a motion of pushing the digital image processing apparatus 1, the CPU/DSP 120 or display control unit 124 determines whether the display unit 171 is displaying the video alone (Operation S110).

If the display unit 171 is not displaying the moving image alone, for example, simultaneously displaying the moving image and the still image, the display control unit 124 makes the display unit 171 to display the moving image alone (Operation S111).

If it is determined that the movement of the digital image processing apparatus 1 is not a motion of pushing the digital image processing apparatus 1 in operation S109, or if the moving image is displayed alone in operation S110, the operation S108 is performed, so that the reproduction of the moving image is repeated or the process is terminated depending on the end of the reproduction of the moving image.

Figure 10:
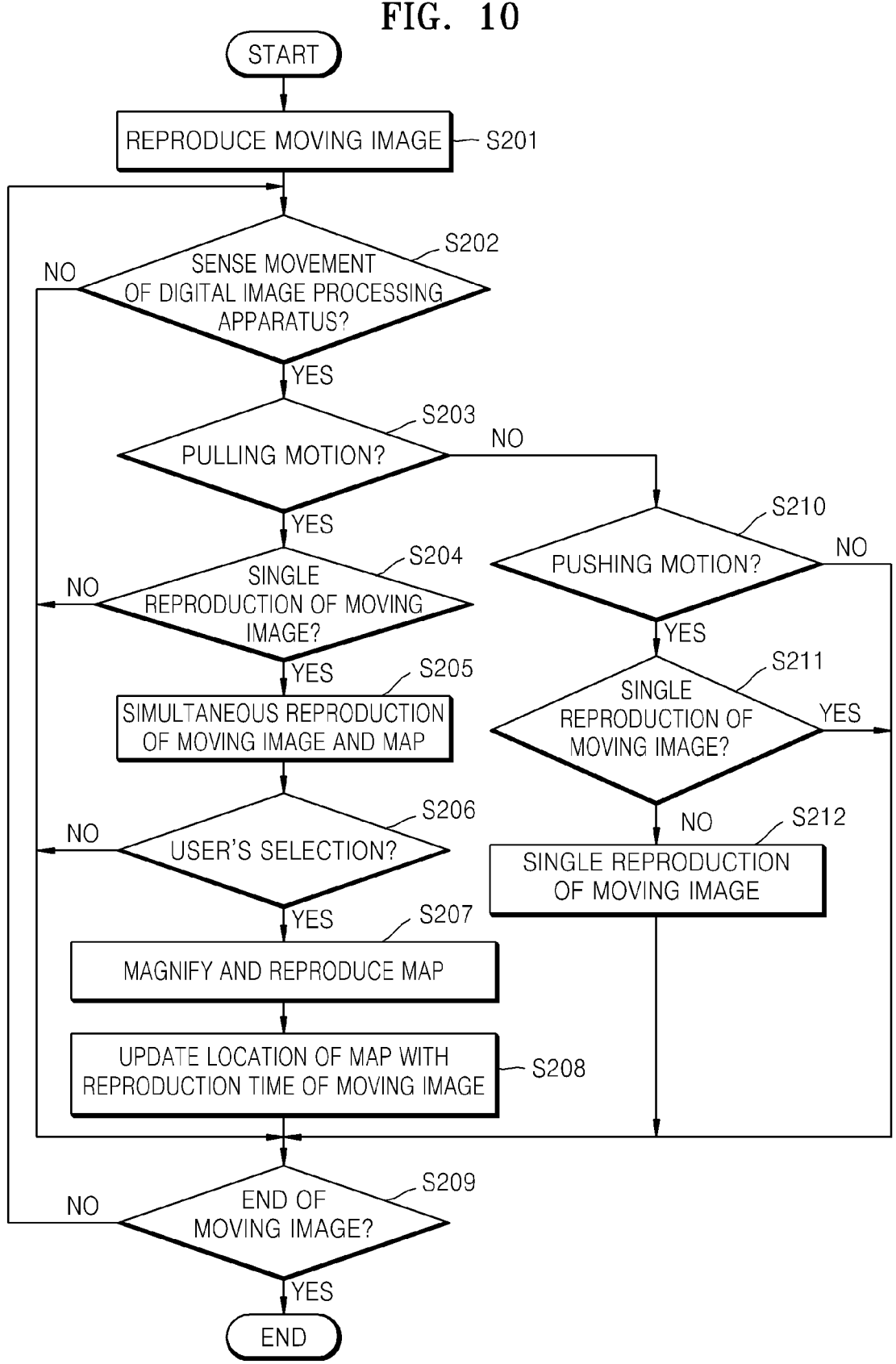
FIG. 10 is a flowchart illustrating a control method performed by a digital image processing apparatus according to another embodiment of the invention.

FIG. 10 is a flowchart illustrating a control method performed by the digital image processing apparatus 1 according to another embodiment of the invention. The control method of FIG. 10 is similar to that of FIG. 9 in terms of operations, and only differences will be described.

According to the current embodiment, if the digital image processing apparatus 1 is pulled toward the user while the moving image is displayed alone, the display control unit 124 simultaneously reproduces the moving image and the map in operation S204 (Operation S205). In this regard, the map may be displayed in a portion of the display unit 171 and have a smaller size than the moving image.

In addition, it is determined whether the user selects the map while simultaneously reproducing the moving image and the map (Operation S206). If the user selects the map, the display control unit 124 magnifies and reproduces the map based on a control signal from the CPU/DSP 120. That is, the reproduction mode is converted such that the display unit 171 displays only the map.

On the reproduced map, a mark indicating the location where the image is captured may be displayed in various ways, for example, by using a point or an arrow. In addition, when the moving image is captured while moving, the mark indicating the location where the image is captured may also be moved. In addition, if the location widely changes, an area or a scale of the map may also be changed. Thus, the map and the mark which are displayed on the display unit 171 may be updated with time (Operation S208). The changes of the map and mark may be synchronized with the moving image in accordance with the reproduction time, although the map and mark are not displayed on the display unit 171.

As described above, the digital image processing apparatus 1 may allow a user to easily and intuitively manage various contents and the digital image processing apparatus 1.

The invention can also be embodied as computer readable codes on a computer readable recording medium. The computer readable recording medium is any data storage device that can store data which can be thereafter read by a computer system.

The computer readable codes are configured to perform operations for realizing a method of controlling a digital image processing apparatus according to the invention when read and executed by a processor (for example, the CPU/DSP 120) from the computer readable recording medium. The computer readable codes may be realized in various programming languages. Also, functional programs, codes, and code segments for accomplishing the invention can be easily construed by programmers of ordinary skill in the art to which the invention pertains.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this invention has been particularly shown and described with reference to embodiments thereof, it will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the invention.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A digital image processing apparatus that displays a first content, which is a moving image, and a second content, which is a still image captured while the moving image is being captured, generated with respect to the first content, the digital image processing apparatus comprising:
 a sensing unit that senses a movement of the digital image processing apparatus;

a movement detecting unit that determines a movement of the digital image processing apparatus based on a sensed signal from the sensing unit; and a display control unit that controls display of the first and second contents, wherein the display control unit controls a single reproduction of the first content or a simultaneous reproduction of the first and second content based on the determination of the movement detecting unit.

2. The digital image processing apparatus of claim 1, wherein the movement detecting unit determines a change of a distance between the digital image processing apparatus and a user.

3. The digital image processing apparatus of claim 2, wherein if the distance between the digital image processing apparatus and the user decreases when the first content is reproduced alone, the display control unit performs the simultaneous reproduction of the first and second contents.

4. The digital image processing apparatus of claim 2, wherein if the distance between the digital image processing apparatus and the user increases while the first and second contents are being simultaneously reproduced, the display control units performs the single reproduction of the first content.

5. The digital image processing apparatus of claim 1, further comprising a manipulation unit that generates a manipulation signal according to a manipulation by a user.

6. The digital image processing apparatus of claim 5, wherein while the first and second contents are being simultaneously reproduced, a single reproduction of the second content is performed based on the manipulation signal.

7. The digital image processing apparatus of claim 1, wherein the display control unit displays a plurality of second contents while the first and second contents are being simultaneously reproduced.

8. The digital image processing apparatus of claim 1, wherein the display control unit reproduces the first content from a point of time when the second content selected by a user is captured.

9. A method of controlling a digital image processing apparatus that displays a first content, which is a moving image, and a second content, which is a still image captured while the moving image is being captured, generated with respect to the first content, the method comprising:

sensing a movement of the digital image processing apparatus;

determining the movement of the digital image processing apparatus based on a result of the sensing; and selecting a reproduction mode between a single reproduction of the first content or a simultaneous reproduction of the first and second content based on the result of the sensing.

10. The method of claim 9, wherein the determining of the movement is performed by sensing a change of a distance between the digital image processing apparatus and a user.

11. The method of claim 10, wherein the selecting of the reproduction mode comprises converting the reproduction mode to the simultaneous reproduction of the first and second contents if the distance between the digital image processing apparatus and the user decreases while the first content is being reproduced alone.

12. The method of claim 10, wherein the selecting of the reproduction mode comprises converting the reproduction mode to the single reproduction of the first content if the distance between the digital image processing apparatus and the user increases while the first and second contents are being simultaneously reproduced.

13. The method of claim 9
further comprising:
reproducing the first content from a point of time when the second content selected by a user is captured while the first and second contents are being simultaneously reproduced.

14. The method of claim 13, wherein a plurality of second contents are displayed while the first and second contents are being simultaneously reproduced.

15. A digital image processing apparatus that displays a first content, which is a moving image, and a second content, which is a map indicating a location where the moving image is captured while the moving image is being captured, generated with respect to the first content, the digital image processing apparatus comprising:

a sensing unit that senses a movement of the digital image processing apparatus;

a movement detecting unit that determines a movement of the digital image processing apparatus based on a sensed signal from the sensing unit; and a display control unit that controls display of the first and second contents, wherein the display control unit controls a single reproduction of the first content or a simultaneous reproduction of the first and second content based on the determination of the movement detecting unit.

16. The digital image processing apparatus of claim 15, wherein the display control unit performs a single reproduction of the second content based on a manipulation signal from the user.

17. A method of controlling a digital image processing apparatus that displays a first content, which is a moving image, and a second content, which is a map indicating a location where the moving image is captured while the moving image is being captured, generated with respect to the first content, the method comprising:

sensing a movement of the digital image processing apparatus;

determining the movement of the digital image processing apparatus based on a result of the sensing; and selecting a reproduction mode between a single reproduction of the first content or a simultaneous reproduction of the first and second content based on the result of the sensing.

18. The method of claim 17
further comprising:
converting the reproduction mode to a single reproduction of the second content based on the manipulation signal from a user when the first and second contents are being simultaneously reproduced.

19. A digital image processing apparatus that displays first content and icons for manipulation, the digital image processing apparatus comprising:

a sensing unit that senses a movement of the digital image processing apparatus;

a movement detecting unit that determines a movement of the digital images processing apparatus based on a sensed signal from the sensing unit; and a display control unit that controls display of the first content and the icon, wherein the display control unit controls a single reproduction of the first content or a simultaneous reproduction of the first content and the icon based on the determination of the movement detecting unit, wherein the movement detecting unit determines whether the digital image processing apparatus rotates or is turned over.

20. The digital image processing apparatus of claim 19, wherein the display control unit performs a single reproduction of a second content generated with respect to the icon based on a manipulation signal from the user.

* * * * *